United States Patent [19]

Dillon, Jr. et al.

[11] Patent Number: 5,031,983

[45] Date of Patent: Jul. 16, 1991

[54] APPARATUS COMPRISING A WAVEGUIDE MAGNETO-OPTIC ISOLATOR

[75] Inventors: Joseph F. Dillon, Jr., Morristown; Raymond Wolfe, New Providence, both of N.J.

[73] Assignee: AT&T Bell Laboratories, Murray Hill, N.J.

[21] Appl. No.: 504,520

[22] Filed: Apr. 4, 1990

[51] Int. Cl.⁵ .................................................. G02F 1/09
[52] U.S. Cl. .................................. 350/96.13; 350/96.12
[58] Field of Search ............... 350/96.12, 96.13, 96.14; 372/703

[56] References Cited

U.S. PATENT DOCUMENTS 4,952,014  8/1990  Lieberman et al. ......... 350/96.29 X
4,973,119  11/1990  Taki ................................... 350/96.13

OTHER PUBLICATIONS

*J. Applied Phys.*, vol. 63, 1988, "Thin-Film Garnet Materials with Zero Linear Birefringence for Magneto-Optic Waveguide Devices," by R. Wolfe et al, pp. 3099-3103.

*Journal of IOOC*, Jul. 1989, Kobe, Japan, "The 45° Waveguide-Isolator," H. Dammann, et al. The information in this article is essentially the same as that later published in *Appl. Phys. Lett.*, vol. 56, 1990–see AV.

*Electronic Letters*, vol. 25, 1989, "Phase Matching in Magneto-Optic YIG Films by Waveguide Temperature Control," by J. P. Castera et al, p. 297.

*Appl. Phys. Lett.*, vol. 56, 1990, "Etch-Tuned Ridged Waveguide Magneto Optic Isolator," by R. Wolfe et al., p. 427.

*Appl. Phys. Lett.*, vol. 56 (14), 1990, "45° Waveguide Isolators with Phase Mismatch," H. Dammann et al., pp. 1302-1304.

*Primary Examiner*—John D. Lee
*Assistant Examiner*—Stephen W. Barns
*Attorney, Agent, or Firm*—M. I. Finston; E. E. Pacher

[57] ABSTRACT

The invention relates to optical systems comprising thin film optical waveguide isolators that are characterized by linear birefringence at least some wavelengths and temperatures. Disclosed is a method for using such a system at more than one wavelength and temperature.

9 Claims, 5 Drawing Sheets

APPARATUS COMPRISING A WAVEGUIDE MAGNETO-OPTIC ISOLATOR

TECHNICAL FIELD

The invention pertains to optical systems, e.g., optical fiber communication systems and optical mass storage devices, which include thin film polarization rotators.

BACKGROUND OF THE INVENTION

The frequency and power intensity spectra of the light emitted by semiconductor lasers employed in optical systems can be altered when reflected light impinges upon the lasers. Such alterations are undesirable because they can lead to errors in the detected information. Thus, efforts have been made to develop devices, called optical isolators, for isolating the semiconductor lasers from reflected light. An optical isolator based on rotation of linearly polarized light is exemplified by a bulk magnetic garnet material, e.g., bulk single crystal yttrium iron garnet ($Y_3Fe_5O_{12}$, called YIG), positioned between a polarizer and an anlyzer. In operation, a magnet is employed to magnetize the YIG (in the direction of light propagation). Light emitted by a laser and linearly polarized after transmission through the polarizer is directed into the YIG material. Under the influence of the net magnetic moment within the (magnetized) material, the linearly polarized light experiences circular birefringence. As a consequence, the light remains linearly polarized, but the polarization direction is continuously rotated in either the clockwise or counterclockwise direction as the light traverses the material. If the material is of appropriate dimension, the polarization direction is rotated through, for example, 45° and the light is thus transmitted by an analyzer set at 45°. Reflected light transmitted by the analyzer also enters the YIG material and also undergoes a rotation of 45° in the same direction as the light which originally traversed the material. Consequently, reflected light, after traversing the YIG material, is polarized at 90° to the polarizer, and is thus precluded from impinging upon the laser. (The phenomenon by which a fixed length of magnetized material rotates both forward and backward propagating linearly polarized light by the same amount and in the same direction is denoted antireciprocal magneto-optical rotation. Devices which include such materials are referred to as antireciprocal devices. By contrast, an optical element that rotates oppositely propagating beams of light in the same direction, but not necessarily by the same amount, is said to be "non-reciprocal.")

Although antireciprocal light-rotating devices based on bulk materials are useful, thin-film-waveguide light-rotating devices are advantageous where incorporation in miniaturized integrated optical devices is envisaged. For example, a thin film optical isolator using planar magnetization would readily permit the use of guided wave optics (and thus eliminate the need for focusing lenses) and could also serve as a building block for integrated optical devices.

Thin film waveguiding devices employing planar magnetization have, in fact, been fabricated. Such devices have included, for example, a magnetized (in the plane of the film) layer of YIG epitaxially grown on a (closely lattice matched) substrate of, for example, gadolinium gallium garnet ($Gd_3Ga_5O_{12}$, called GGG). While these devices are potentially attractive, they are, unfortunately, subject to linear birefringence. Linear birefringence means that the TE and TM components of the light see different refractive indices, resulting in one of these components propagating through the film at a faster speed than the other. Thus, when traversing a magnetized thin film, e.g., a magnetized layer of YIG, light is subjected to a birefringence which includes both a linear component and a circular component. As a consequence, reflected light is incompletely blocked. Thus, the effects of linear birefringence in thin film, magnetized, waveguiding devices have presented a serious obstacle to their advantageous use.

The factors responsible for the linear birefringence found in thin films of, for example, YIG have been identified. One of these factors is what is here termed shape linear birefringence, which is due to the presence of discontinuities in refractive index at the film-air and film-substrate interfaces. A second factor responsible for linear birefringence, commonly termed stress-induced linear birefringence, is due to a lattice mismatch between the film and the substrate. This mismatch subjects the film to either a compressive or tensile stress in the plane of the film, which, like shape linear birefringence, has the effect of inducing a refractive index anisotropy in the film. A third factor responsible for linear birefringence, commonly termed growth-induced linear birefringence, is due to a non-random distribution of certain ions in the film crystal lattice, produced by the conventional techniques used to epitaxially grow films on substrates. In many cases, the sign of the stress-induced and/or growth-induced linear birefringence is opposite to that of the shape linear birefringence. Thus, these different sources of linear birefringence can be used to cancel each other to produce zero net linear birefringence.

For example, R. Wolfe et al, "Thin-Film Garnet Materials with Zero Linear Birefringence for Magneto-Optic Waveguide Devices (Invited)", *J. Applied Phys.*, Vol. 63, pp. 3099–3103, (1988) describes a method for fabricating a thin film, waveguiding, polarization rotator which achieves essentially zero net linear birefringence, i.e., achieves a value of the dimensionless ratio B/F less than or equal to about 0.1. The ratio B/F expresses the ratio of linear birefringence to Faraday rotation. B is equal to $\Delta\beta/2$, where $\Delta\beta = 2\pi\Delta n/\lambda$ and $\Delta n$ denotes the difference in the refractive indices seen by the TE and TM components, while $\lambda$ denotes the wavelength of the light. Physically, $\Delta\beta$ is the phase difference (induced by the net linear birefringence) between the TE and TM components per unit length of film, and has dimensions of, for example, radians per centimeter. In addition, F denotes the Faraday rotation per unit length of the film. F is expressed in the same units as $\Delta\beta$, e.g., in radians per centimeter.

Wolfe et al reported that in epitaxial garnet films, $\Delta n$ can be reduced to small values by (1) growing single-mode multilayer films to minimize the shape effect, (2) growing the films in compression to control the stress-induced effect, and (3) annealing at high temperatures to eliminate the growth-induced effect. The remaining birefringence can be reduced to zero by growing the top active layer so thick that the shape effect is smaller in magnitude than the stress effect, and then thinning it by chemical etching until the effects exactly cancel each other at a particular wavelength and temperature. An alternative method is to begin with a thin top layer such that the magnitude of the shape effect is relatively large, and then to deposit a dielectric layer such as silicon nitride of the proper thickness to reduce the shape effect so that it exactly cancels the stress effect.

By the method of Wolfe et al, linear birefringence at a given temperature and at a given wavelength can be essentially eliminated from a thin-film magnetic waveguide. If the waveguide is, moreover, composed of a non-reciprocal material, a useful non-reciprocal optical device such as an isolator is readily produced.

However, it may be necessary, in practice, to operate the waveguide over a range of wavelengths and temperatures, and hence it may be necessary to tolerate a small but significant amount of linear birefringence in the waveguide.

H. Dammann, et al, Abstract: "The 45° Waveguide-Isolator," *Journal of IOOC*, July 1989, Kobe, Japan (to be published) have described a method of using a thin-film optical isolator that achieves useful optical isolation in the presence of linear, as well as magnetic circular, birefringence. Dammann, et al, observed that despite the presence of linear birefringence, light that enters such a waveguide in a linear polarization state will always exit in a linear polarization state, provided that at the midpoint of the waveguide, the major axis of the polarization ellipse is parallel or perpendicular to the major surface of the waveguide. (This condition is here referred to as the Dammann condition.) Significantly, magnetic materials having linear birefringence are not, in general, anti-reciprocal, although they may be non-reciprocal. As a consequence, although a non-reciprocal waveguide can readily be provided that satisfies the Dammann condition for light propagating in one direction, the forward beam and the reflected (reverse-propagating) beam will not, in general, simultaneously satisfy the condition.

Thus, for example, an optical isolator using Dammann's principle is advantageously made by providing a non-reciprocal, 45° optically rotating waveguide. For illustrative purposes, it is assumed that linearly polarized light enters such a waveguide through an input polarizer oriented at 67.5° from the TE mode orientation (considered to correspond to 0°) and exits through an output polarizer oriented at 22.5°. In a practical isolator, it is typically important to minimize the amount of reflected light that escapes in the reverse direction, even at the expense of suffering some loss in the forward direction. In order to assure that the reflected light is maximally blocked by the input polarizer (oriented at 67.5° to the TE axis), the waveguide is designed such that the reflected light, rather than the forward-propagating light, satisfies the Dammann condition.

That is, in general, the forward-propagating light arrives at the output polarizer in an elliptical polarization state. A portion of this light is resolved and transmitted by the output polarizer. Reverse-propagating light (i.e., light reflected by any discontinuity in the optical path) passes through the output polarizer and starts out with linear polarization at 22.5°. This light satisfies the Dammann condition. That is, at the midpoint of the waveguide, the polarization ellipse has a major axis at 0°, and the light arrives at the entrance polarizer linearly polarized at −22.5°. This light is completely blocked by the input polarizer, giving essentially perfect reverse extinction.

Provided the amount of linear birefringence in the waveguide is relatively small, the forward-propagating light that is incident on the output polarizer will have a relatively large component transmissible by the output polarizer, and the waveguide will be useful as a practical optical isolator. However, the greater the linear birefringence, the greater the loss at the output polarizer is likely to be.

Because linear birefringence is known to be sensitive to wavelength and temperature, it has until now been believed that the method of Dammann, et al, is useful only for operation at essentially a single optical wavelength, and within a narrow, carefully controlled temperature range.

The effect of temperature on magnetic thin film optical isolators has been discussed, for example, by J. P. Castera et al, "Phase Matching in Magneto-Optic YIG Films by Waveguide Temperature Control," *Electronics Lett.*, Vol. 25, p. 297 (1989). Castera reported the construction of a waveguide isolator that could be tuned to essentially zero linear birefringence by using temperature to alter the stress-induced component of the linear birefringence. Significantly, Castera reported that because of the sensitivity of the birefringence to temperature, such a tuned device would require temperature stabilization. For example, the temperature would have to be maintained within a 2° C. range in order to achieve a stable isolation of 30 dB.

The wavelength sensitivity of such isolators has been discussed, for example, by R. Wolfe, et al, "Etch-Tuned Ridged Waveguide Magneto-Optic Isolator," *Appl. Phys. Lett.*, Vol. 56, p. 427 (1990). Wolfe reported that when pure TE light was injected into an etch-tuned waveguide isolator, the isolation ratio changed from a desirable value of −35 dB at the tuning wavelength of 1.545 $\mu$m to a much less desirable value of −16 dB at 1.45 $\mu$m. Thus, because of the wavelength sensitivity of the birefringence, the isolation ratio fell in magnitude by 19 dB over a wavelength range of less than 0.1 $\mu$m.

SUMMARY OF THE INVENTION

It has been discovered that when a thin-film magneto-optic isolator is operated according to the method of Dammann, et al, excellent reverse isolation and moderate forward loss can be obtained over an unexpectedly broad range of wavelengths and temperatures.

Thus in one embodiment, the invention involves providing a thin-film magneto-optic isolator having an input polarizer oriented near 67.5° and an output polarizer oriented near 22.5° to the TE or TM direction (or vice versa) and using the isolator at least two wavelengths, separated by at least about 0.05 $\mu$m. Significantly, a wavelength range of at least 0.05 $\mu$m is useful in connection with transmission of wavelength division multiplexed optical signals.

In another embodiment, the invention comprises using such an isolator which, moreover, is tuned to have essentially zero linear birefringence at a first wavelength, near the low-temperature end of a temperature operating range spanning more than about 20° C.

DETAILED DESCRIPTION OF A PREFERRED EMBODIMENT

Figure 1:
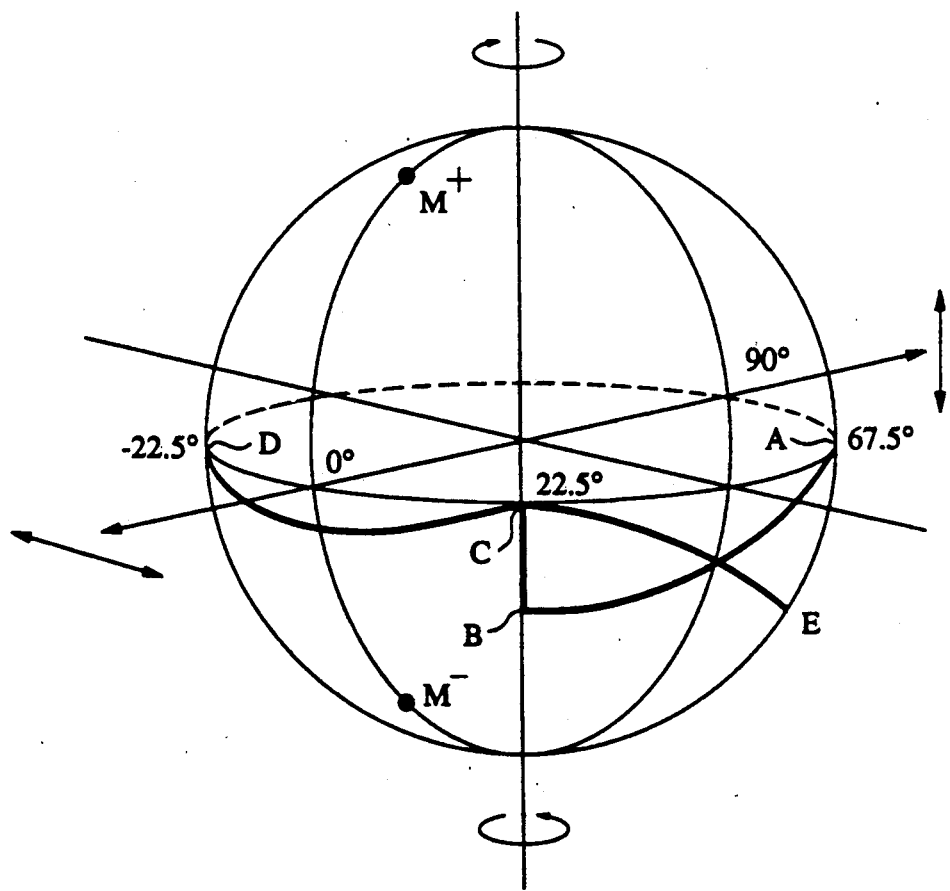
FIG. 1 is a perspective view of the Poincaré sphere, which is a graphical device for representing polarization states and their evolution. Depicted is the trajectory ABCD of the polarization state of light in an optical isolator using the method of Dammann, et al.

The following discussion is simplified by reference to a visual aid, depicted in FIG. 1, known as the Poincaré sphere. The Poincaré sphere is a mapping of the polarization states of a light wave onto the surface of a sphere. The evolution of these states as the light wave propagates through, e.g., a non-absorbing, birefringent waveguide, is conveniently represented by trajectories on the surface of the sphere.

On this sphere, points on the equator represent linearly polarized states, such that the point representing 0° (pure TE) is diametrically opposite the point representing 90° (pure TM). The poles represent circular polarization, and all other points correspond to elliptically polarized states. The point $M^+$ corresponds to the polarization state of the faster of the two waveguide eigenmodes when the magnetization is parallel to the forward light propagation direction. Conversely, the point $M^-$ corresponds to the faster eigenmode when the magnetization is antiparallel to the forward propagation direction. (Thus, the point $M^+$ would lie at the north pole if the material were characterized by a finite Faraday rotation, but zero linear birefringence.) Every trajectory representing the evolution of a polarization state (in a lossless waveguide) is an arc on the surface of the sphere of a clockwise rotation centered on $M^+$ or $M^-$.

Thus, in the exemplary optical isolator discussed above, point A represents the input polarization of light propagating in the forward direction. Path AB represents the evolution of the light from the input to the output polarizers. The length of arc BC is indicative of the excess forward loss (i.e., forward loss due to polarization effects, and not attributable to inherent losses in the waveguide). Path CD represents the reverse propagating light. It should be noted, in particular, that the midpoint of path CD lies on the 0° meridian, and thus the Dammann condition is satisfied. As a consequence, the reverse propagating light arrives at point D in a state of pure linear polarization that is completely blocked by the input polarizer. In this example, both path AB and path CD lie on clockwise rotations about point $M^+$.

Figure 2:
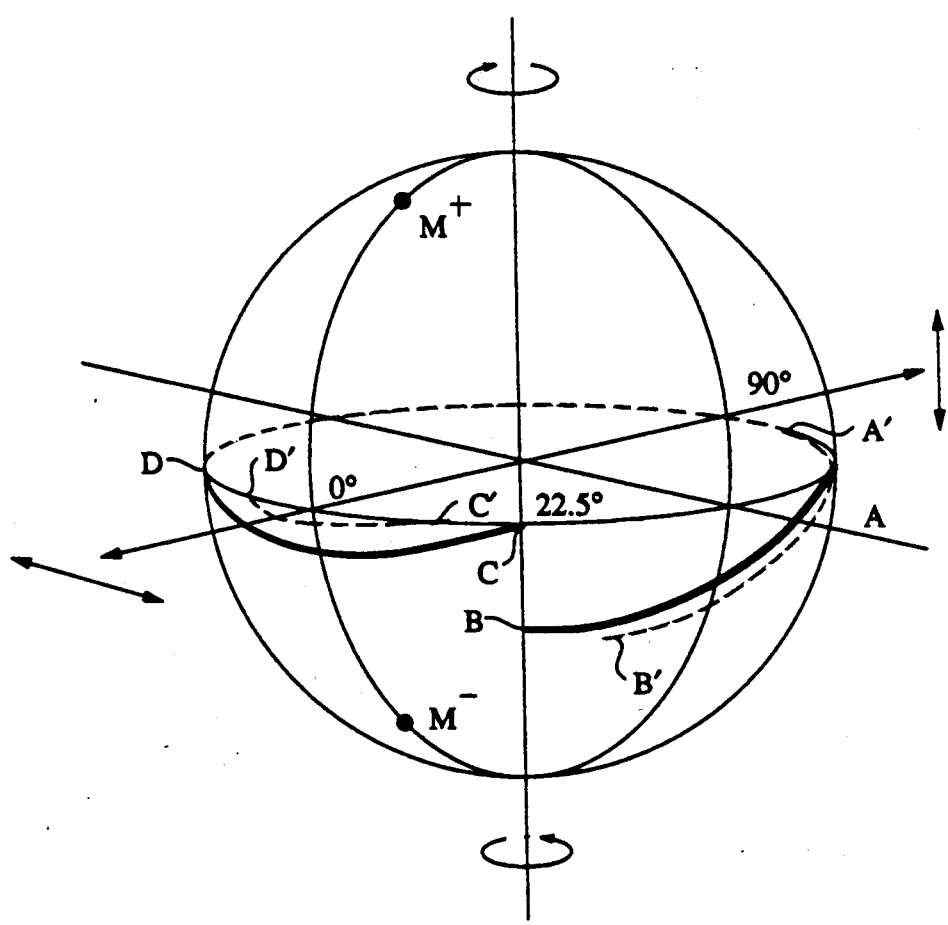
FIG. 2 depicts the Poincaré sphere of FIG. 1, and further shows the effect of shifting the output polarization away from 22.5°.

Further properties of the optical isolator are made clear by reference to the Poincaré sphere. For example, with reference to FIG. 2, a 22.5° orientation of the output polarizer (point C), although optimal, is not unique. That is, a different orientation a few degrees away from 22.5° could be chosen. Such an orientation may be represented, for example, by point C'. In such a case, the Dammann condition is still satisfied, and essentially perfect reverse isolation is still achieved, provided point D, representing the state of polarization of the reverse propagating light when it arrives at the input polarizer, undergoes a symmetrical displacement to point D'. Because the input polarizer must be orthogonal to the polarization represented by point D', it is necessary to correspondingly shift point A to point A'. The result, in the example as depicted, is a total rotation in the isolator of somewhat less than 45°, with input polarization angle somewhat greater than 67.5°. Because both the input state and the rotation are changed, the shift of point B (representing the fully rotated state of the forward-propagating light) to point B' has twice the angular size of the other corresponding shifts described here. The increased arc length B'C', relative to BC, represents the increased excess forward loss brought about by these changes. It is readily apparent from the figure that either a clockwise or a counter-clockwise shift of point C will increase the excess forward loss. It is in this sense that the 22.5° selection is optimal. Variations of up to about 5° (in either the positive or negative direction) can be practiced without incurring prohibitive excess forward loss.

The total length of waveguide required to produce a perfect 45° rotation, corresponding to path CD, is here denoted $L_{45}$, and is given theoretically by $$L_{45} = \frac{1}{\kappa} \cdot \arctan \frac{\kappa}{F}, \text{ where } \kappa = [F^2 + B^2]^{\frac{1}{2}},$$

where, as noted previously, $B = \Delta\beta/2$.

Figure 3:
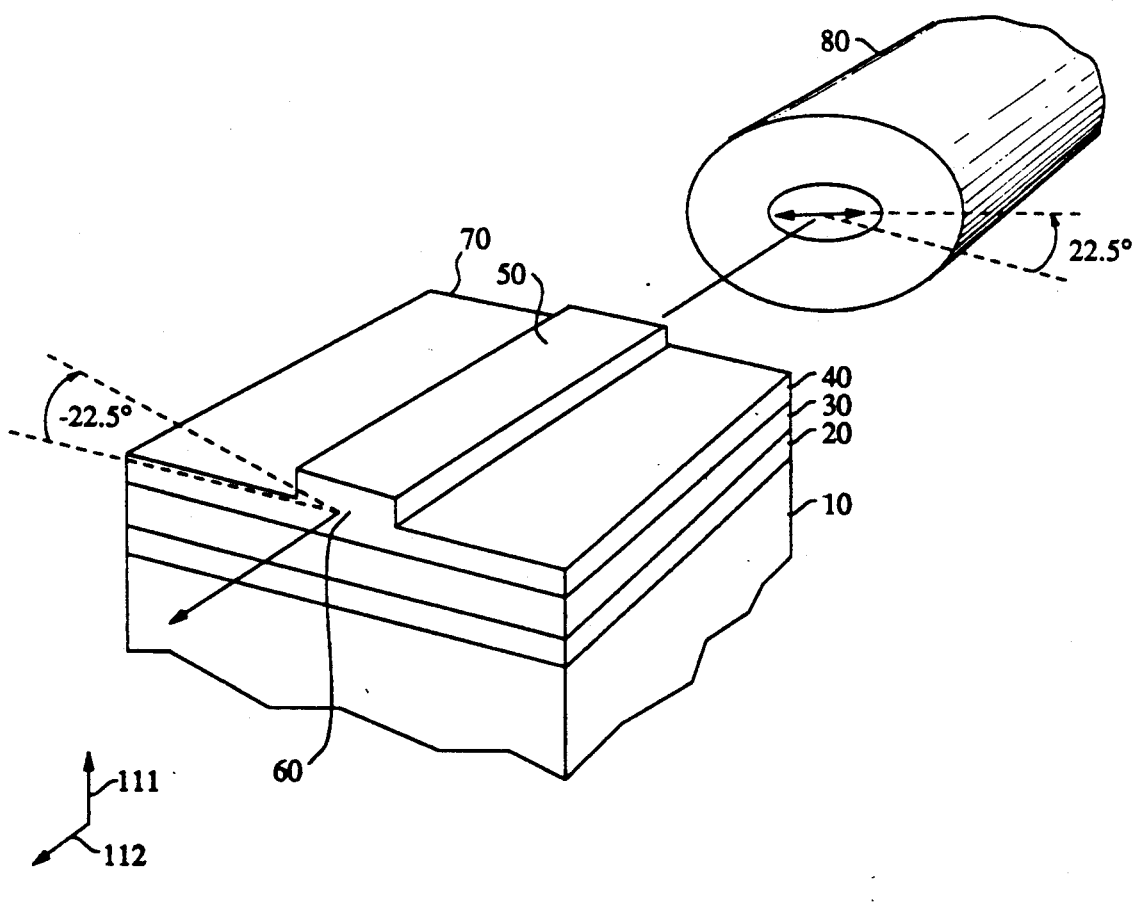
FIG. 3 is a schematic, perspective view of an optical waveguide isolator.

Turning now to FIG. 3, a preferred embodiment of the invention involves an etch-tuned ridge waveguide isolator, as described, for example, in R. Wolfe, et al., *J. Appl. Phys.*, Vol. 63, p. 3099 (1988), and in R. Wolfe, et al., *Appl. Phys. Lett.*, Vol. 56, p. 427 (1990). The waveguide is a triple layer film of modified bismuth yttrium iron garnet (Bi-YIG) that has been designed to support a single TE mode and a single TM mode. The layers are grown, for example, by conventional methods of liquid phase epitaxy on a (111)-oriented GGG substrate 10. High optical loss is imparted to the bottom layer 20 to make it behave as a mode stripping layer (i.e., to make it absorb all modes except the lowest order TE and TM modes). Specifically, the bottom layer is doped with cobalt, and the yttrium is replaced with three rare earth elements having absorption peaks near the chosen operating wavelength, which is exemplarily about 1.5 µm. The three rare earth elements are praseodymium, samarium, and erbium. The nominal composition of this layer is $(Bi_{0.5}Er_{1.4}Sm_{0.7}Pr_{0.4})(Fe_{4.0}Co_{0.2}Al_{0.8})O_{12}$.

The middle layer 30 and the top layer 40 are low loss layers, having nominal composition $(Bi_{0.5}Y_{2.5})(Fe_{3.7}Ga_{1.3})O_{12}$. These layers are doped with calcium, which is partially compensated by oxygen vacancies, so that their growth-induced uniaxial anisotropy can be annealed out at a moderate temperature (e.g., about 1050° C.). The concentration of bismuth in the top layer is greater than that in the middle layer, resulting in an increase of the refractive index of the top layer relative to the middle layer by about 0.5%. The top and middle layers are each about 3.4 µm thick.

The linear birefringence in the waveguide is reduced to zero at a wavelength of about 1.5 µm by etching the top surface of the top layer in phosphoric acid. At least one ridge 50 is etched into the top surface of the waveguide to provide a guiding channel. The ridge is etched by the ion-implantation enhanced etching method. That is, the waveguide is implanted with silicon ions through a photoresist pattern. The photoresist is removed, and the waveguide is etched in phosphoric acid. The etch rate of the implanted regions is enhanced about 1000 times relative to the non-implanted regions. The phosphoric acid etch leaves at least one ridge, exemplarily 8 μm wide and 0.5 μm high. The ridge or ridges are aligned along a <112> direction, which is one of the easy magnetization directions in the (111) plane of the film. After the ridge or ridges are formed, the waveguide is retuned to zero linear birefringence at 1.545 μm by depositing a layer of $Si_3N_4$, 700 Å in thickness, on the top surface of the waveguide.

The measured Faraday rotation of the exemplary waveguide, made as described, is about 133°/cm. To make a 45° rotator, the waveguide is cut to a length of 3.4 mm, and the edges 60 and 70 are polished and antireflection coated.

A useful input is provided by a polarization-maintaining optical fiber 80 having a major axis that is rotated about 22.5° from the TE or TM direction. The polarized light is end-fire coupled from the fiber into the waveguide. Alternatively, the fiber itself can be a polarizing fiber, oriented about 22.5° from the TE or TM direction.

Similarly, a useful output is provided by a polarization-maintaining optical fiber (not shown) having a major axis that is rotated 45° (in the direction of optical rotation) from the major axis of the input fiber. (Significantly, if the major axis of the input fiber is oriented 22.5° from the TE direction, then the major axis of the output fiber is oriented 22.5° from the TM direction, and vice versa.) Light exemplarily is directly coupled from the ridge waveguide into the fiber and an output polarizer is placed at the far end of the fiber. Alternatively, a polarizing fiber can be used.

A magnetic field parallel to the propagation direction having sufficient strength to magnetically saturate the waveguide is applied using, for example, a permanent bar magnet or an electromagnetic coil. A field strength of 30 Oe is typically used.

One useful figure of merit for the waveguide, here called the reverse isolation ratio (RIR), describes its effectiveness as an optical isolator. That is, let $I_{rev}^{out}$ represent the intensity of reverse propagating light transmitted by the input polarizer. Then the RIR is the reverse attenuation, and it is equivalent to $I_{rev}^{out}$ expressed as a fraction of the transmitted reverse-propagating light which is reflected into, or otherwise enters, the isolator. That is, $$RIR = I_{rev}^{out}/I_{rev}^{in},$$

where $I_{rev}^{in}$ represents the intensity of the light entering the isolator in the reverse direction. In the ideal case, no reverse-propagating light is transmitted. The corresponding value of the RIR is zero, or "negative infinity" decibels (dB). Experimentally measured values, expressed in dB, will be negative, and, for a useful waveguide, are desirably less than (i.e., more negative than) about −10 dB, and preferably less than about −20 dB.

A second useful figure of merit for the waveguide, here called the forward extinction ratio (FER), is used here as a measure of the excess forward loss. That is, let $I_{inh}$ represent the intensity of a beam of light that exits the waveguide in the forward direction having suffered inherent losses in the waveguide (due, for example, to scatter and absorption), but that has not experienced any excess forward loss. Let $I_{fwd}$ represent the corresponding intensity when the same beam of light additionally suffers excess forward loss. Then the FER is the excess forward loss, expressed as a fraction of $I_{inh}$. That is, $$FER = (I_{inh} - I_{fwd})/I_{inh}.$$

Ideally, there is only inherent loss in the forward-propagating beam, and the FER is consequently equal to zero (or "negative infinity" dB). In the worst possible case, there is no forward transmission at all, and the FER equals unity (or 0 dB). For a useful waveguide, the FER is desirably at most about −1 dB, and preferably less than about −3 dB.

Both figures of merit are readily measured by a technique to be described below.

It has been discovered that, contrary to the general prior art understanding, an optical isolator made as described above can exhibit values of the RIR less than −30 dB and values of the FER less than −10 dB over a spectral range of at least about 0.15 μm, exemplarily extending from about 1.430 μm (i.e., about 0.115 μm below the exemplary tuning wavelength for B=0) to about 1.580 μm (i.e., about 0.035 μm above the exemplary tuning wavelength). It is believed that a useful range for the same isolator is at least 0.25 μm in extent, and can include both 1.3 μm and 1.55 μm, currently the two most important wavelengths for optical communication. A theoretical basis for predicting the useful range is discussed, for example, in R. Wolfe, et al., *Appl. Phys. Lett.*, Vol. 56, p. 427 (1990).

Because $L_{45}$ changes as the wavelength is varied, and is equal to the waveguide length only at the tuning wavelength, it is generally desirable to rotate the output polarizer each time the wavelength is changed in order to obtain the best value of the RIR at each wavelength. If the output polarizer is not rotated, then an inferior (although possibly acceptable) RIR is generally achieved.

It should be noted that a similarly wide useful spectral range is expected even for at least some waveguide isolators that are not tuned to B=0 at any wavelength. That is, a useful range of at least about 0.2 μm about a central wavelength is expected provided only that: (1) the waveguide has an input polarization of about 22.5° relative to the TE or TM direction; (2) the waveguide satisfies the Dammann condition for reverse-propagating light at the central wavelength; and (3) the ratio B/F is less than about 1 at the central wavelength (for which the Dammann condition is exactly satisfied).

Because the dependence of $L_{45}$ on wavelength is subject to at least two separate effects that tend to partially compensate each other, there is a range of wavelengths over which the waveguide isolator can be used even without rotating the output polarizer. First, the Faraday coefficient F tends to decrease as the wavelength is increased. The result of this effect, alone, would be to increase $L_{45}$ as the wavelength is increased. Second, $L_{45}$ tends, at fixed values of F, to decrease as the linear birefringence B is increased. In a fixed-length waveguide, these effects can be made to at least partially cancel over some range of wavelengths by etch-tuning the waveguide to the low-wavelength end of the range, e.g., to the lowest wavelength of the range. As the wavelength is increased, F decreases and B increases, such that $L_{45}$ remains close to the fixed length of the waveguide. Thus, not only can the same isolator be used, separately, at more than one wavelength, but furthermore, a signal or combination of signals comprising multiple wavelengths, simultaneously, can be use-fully transmitted. As noted, a useful wavelength range for such transmission is at least about 0.05 μm. Such multiple-wavelength transmission is especially useful in connection with wavelength division multiplexed signal transmission.

Moreover, the linear birefringence varies not only with wavelength, but also with temperature. For example, if a waveguide isolator similar to that described here is either heated to 30° C. above, or cooled to 30° C. below, the temperature at which it is tuned to B=0, B in an exemplary isolator increases from 0 (at the tuning wavelength) to about 90°/cm, resulting in an excess forward loss of 1 dB. (See, for example, J. P. Castera, et al., "Phase Matching in Magneto-Optic YIG Films by Waveguide Temperature Control," *Electronics Lett.*, Vol. 25, p. 297 (1989).) Because 1 dB is generally an acceptable loss, the useful temperature range of the waveguide isolator can be at least 60° C. wide.

Good reverse isolation can be obtained over an even greater range of temperature by making use of the temperature dependence of F. That is, F generally decreases when the temperature is increased. Thus, if the waveguide is tuned at the low end of the temperature range over which the waveguide is to be used, any other temperature within that range will correspond to a smaller value of F and a greater value of B. Analogously to the wavelength compensation discussed above, these temperature effects will at least partially compensate to keep the value of $L_{45}$ close to the fixed length of the waveguide over some temperature range. In the waveguide discussed here, such a temperature range is even greater than 60° C. In the absence of temperature stabilization, temperatures in optical isolators may fluctuate by, typically, more than about 20° C. Thus, in particular, a useful temperature-compensated isolator is made by predetermining a temperature operating range spanning more than about 20° C., and tuning the waveguide at a temperature near the low end of the range, e.g., at a temperature differing from the lowest temperature of the range by less than about 10% of the range.

Moreover, the temperature compensation effect permits operation with good reverse isolation over a moderate temperature range even without rotating the output polarizer.

Figure 5:
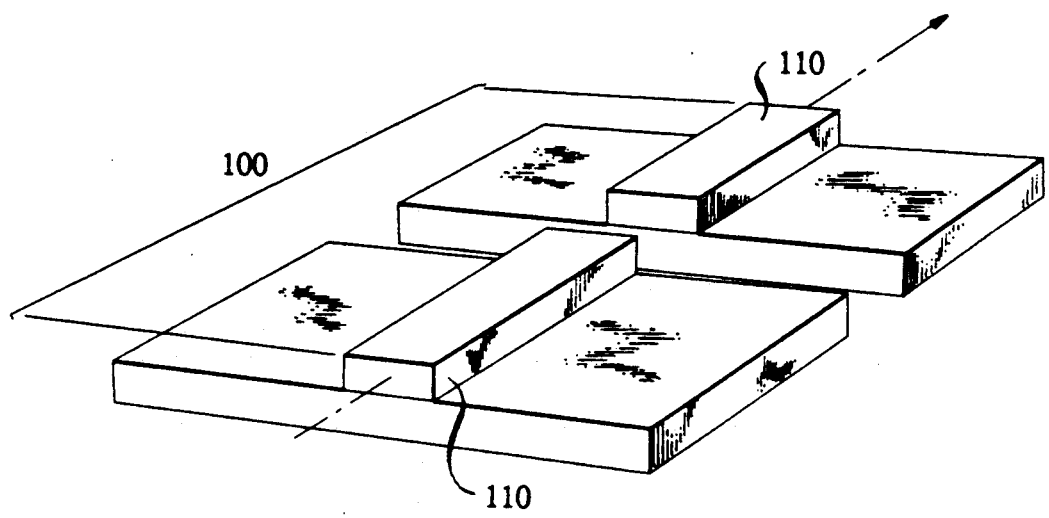
FIG. 5 schematically illustrates the division of a processed substrate to form a multiplicity of waveguides, according to one aspect of the invention.
Figure 6:
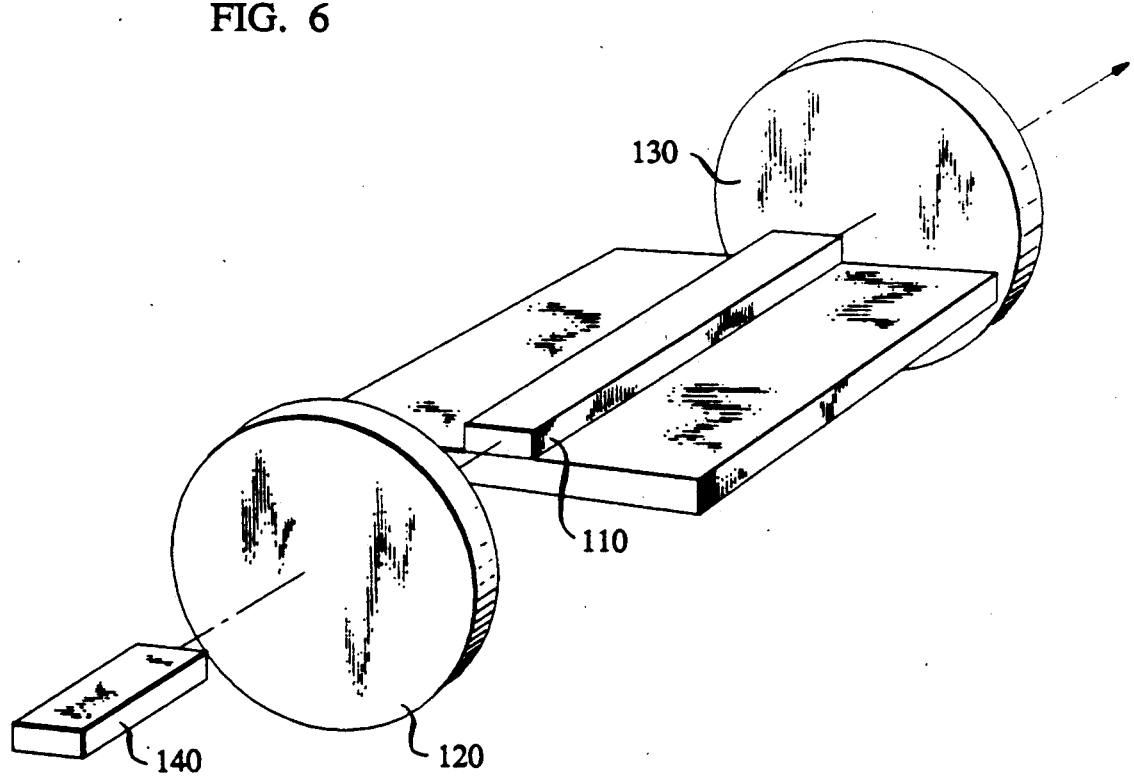
FIG. 6 is a schematic diagram of an optical system made according to one aspect of the invention.

In summary, tuned waveguide isolators with input polarizations of 22.5° (relative to TE or TM) are useful even without perfect tuning of the linear birefringence to zero. As a consequence, a single substrate (e.g., a wafer of GGG) can be used to make isolators that can operate at different wavelengths over a substantial range, including, for example, both 1.3 μm and 1.55 μm. That is, with reference to FIG. 5 and FIG. 6, a magnetic thin film optical waveguiding structure 100 can be formed on the substrate. The substrate can then be divided (e.g., into at least two essentially identical waveguide portions 110), and input polarizer 120 and output polarizer 130 added, to form at least two isolators. Each of the two isolators can be provided with a different light source 140, the sources providing, respectively, wavelengths differing by at least 0.05 μm (e.g., wavelengths of 1.3 μm and 1.55 μm, as noted). Although not essential, the relative orientations of the input and output polarizers can be adjusted to give the best reverse isolation at each of the respective wavelengths. Each such device can have good reverse isolation and moderate excess forward loss over a practical operating range of wavelength and temperature. In addition, the operating ranges of wavelength and temperature can be extended still further by designing the waveguides to make use of wavelength and temperature compensation phenomena.

EXAMPLE

An etch-tuned ridge waveguide isolator was made as described above. Light from a color-center laser, tunable from 1.43 μm to 1.58 μm, was end-fire coupled into the waveguide through a polarization-maintaining fiber. The major axis of the fiber was rotated by 22.5° from the plane of the waveguide, such that linearly polarized light from the laser entered the waveguide in a state corresponding to point C on the Poincaré sphere of FIG. 1. For purposes of the experimental demonstration, light was propagated through the waveguide only in the reverse direction. To simulate forward propagation, the applied magnetic field was periodically reversed. That is, with the magnetic field parallel to the propagation direction, the polarization state traced out path CD on the Poincaré sphere. With the field antiparallel, the polarization state traced out path CE.

Path CE is a clockwise rotation about point $M^-$. It is apparent from symmetry considerations that path CE is congruent to path AB, which is a clockwise rotation about point $M^+$. Therefore, arc BC is equal to arc EA, and the corresponding excess forward losses are equal.

An output analyzer was provided, consisting of a Glan-Thompson prism polarizer. The output analyzer could be oriented, inter alia, in a range including −22.5° and a range including 67.5°.

The RIR was measured by setting the output analyzer at 67.5°. The respective transmitted light intensities with field parallel and antiparallel to the propagation direction were measured. The RIR was taken as the ratio of the parallel-field intensity (corresponding to point D on the Poincaré sphere) to the antiparallel-field intensity (corresponding to point E).

The FER was measured by setting the output analyzer at −22.5°. The respective transmitted light intensities with field parallel and antiparallel to the propagation direction were again measured. The FER was taken as the ratio of the antiparallel-field intensity (point E) to the parallel-field intensity (point D).

Figure 4:
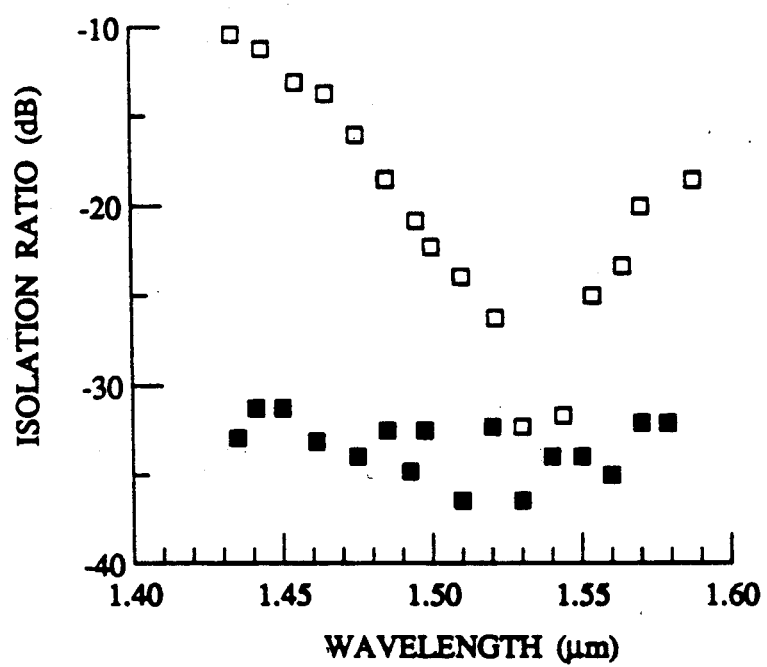
FIG. 4 is a graph of the isolation ratios achieved by an exemplary isolator, measured as a function of temperature. Two different isolation ratios are plotted. The solid squares represent the reverse isolation ratio (RIR—to be defined, below), and the open squares represent the forward extinction ratio (FER—to be defined, below).

With reference to FIG. 4, the solid squares represent the measured RIR as a function of wavelength over the tunable range of the laser, and the open squares represent the measured FER over the same range. It will be noted that near the zero linear birefringence wavelength, the measured RIR was about −37 dB, and the measured FER was about −32 dB. At each wavelength, the output polarizer was rotated to optimize the RIR. The measured RIR was −32 dB or better over the entire accessible wavelength range. These measurements were limited by scattered light in the experiment and not by the inherent properties of the waveguide isolator.

It should be noted that the light propagating in the input fiber was elliptically, rather than linearly, polarized because unintentional twisting of the fiber added a component of circular birefringence to the inherent linear birefringence of the fiber. As a consequence, the polarization state of the light entering the waveguide isolator varied periodically with wavelength. The light entering the waveguide isolator was linearly polarized at the wavelengths represented in FIG. 4 by data points, but between those points, the light entered the waveguide in a state of elliptical polarization.

As is apparent from the figure, the FER deteriorated as the magnitude of the linear birefringence of the waveguide increased on either side of the tuned wavelength. However, the FER of −10 dB, at the shortest wavelength tested, corresponds to a maximum excess forward loss of only about 10%.

We claim:

1. Apparatus comprising:
   (a) thin film optical waveguide means and means for applying a magnetic field to the waveguide means, the waveguide means having input and output ends and a TM and a TE direction and being adapted for causing, at a first temperature, essentially a 45° optical rotation of linearly polarized light of a first wavelength that propagates from the output to the input end if the plane of polarization of the light of the first wavelength is, at the output end of the waveguide means, oriented at an angle essentially equal to 22.5° relative to the TM or TE direction of the waveguide means;
   (b) input and output polarization means for linearly polarizing light, the output polarization means associated with the output end of the waveguide means and set to produce a plane of polarization essentially at 22.5° relative to said TM or TE direction and the input polarization means associated with the input end of the waveguide means and set to produce a plane of polarization essentially 45° from the plane of polarization of the output polarization means; and
   (c) a source of light that is optically connected to the combination of (a) and (b); wherein
   (d) associated with the combination of (a) and (b) are a forward extinction ratio (FER) and a reverse isolation ratio (RIR) at the first temperature for light from the source, the FER being at most about −1 dB and the RIR being less than about −20 dB; characterized in that
   (e) the light source emits light of a second wavelength, the first wavelength differing from the second wavelength by at least about 0.05 μm.

2. Apparatus of claim 1, further comprising means for rotating the plane of polarization produced by the input and/or output polarization means such that the magnitude of the RIR can be maximized at the second wavelength.

3. Apparatus of claim 1, wherein the waveguide means are tuned to have essentially zero linear birefringence at the first wavelength and the first temperature.

4. Apparatus of claim 3, wherein a wavelength operating range greater than about 0.05 μm is predetermined, and the first wavelength is the lowest wavelength of the wavelength operating range.

5. Apparatus comprising:
   (a) thin film optical waveguide means and means for applying a magnetic field to the waveguide means, the waveguide means having input and output ends and a TM and a TE direction and being adapted for causing, at a first temperature, essentially a 45° optical rotation of linearly polarized light of a first wavelength that propagates from the output to the input end if the plane of polarization of the light of first wavelength is, at the output end of the waveguide means, oriented at an angle essentially equal to 22.5° relative to the TM or TE direction of the waveguide means;
   (b) input and output polarization means for linearly polarizing light, the output polarization means associated with the output end of the waveguide means and set to produce a plane of polarization essentially at 22.5° relative to the TM or TE direction and the input polarization means associated with the input end of the waveguide means and set to produce a plane of polarization essentially 45° from the plane of polarization of the output polarization means; and
   (c) a source of light that is optically connected to the combination of (a) and (b); wherein
   (d) associated with the combination of (a) and (b) are a forward extinction ratio (FER) and a reverse isolation ratio (RIR) at the first temperature for light from the source, the FER being at most about −1 dB and the RIR being less than about −20 dB; characterized in that
   a temperature operating range greater than about 20° C. is predetermined;
   the first temperature differs from the lowest temperature of the temperature operating range by less than about 10% of the range; and
   the waveguide means are tuned to have essentially zero linear birefringence at the first wavelength and the first temperature.

6. A method for manufacturing at least two optical systems, comprising the steps of:
   providing a substrate;
   forming, on the substrate, at least one magnetic thin film optical waveguiding structure;
   dividing the substrate into at least two parts, each part having two ends and including between the ends a portion of the waveguiding structure adapted to produce about a 45° optical rotation of light propagating from one of the ends to the other of the ends, such that at least first and second essentially identical waveguides are formed; and
   providing at least first and second light sources adapted for transmitting essentially monochromatic light into, respectively, the first and second waveguides,
   characterized in that
   the first light source transmits light of a first wavelength, the second light source transmits light of a second wavelength, and the second wavelength is at least 0.05 μm greater or smaller than the first wavelength.

7. The method of claim 6, further comprising the steps of:
   providing at least first and second input polarization means for linearly polarizing light entering, respectively, the first and second waveguides, each of the input polarization means having a polarization axis;
   providing at least first and second output polarization means for linearly polarizing light exiting, respectively, the first and second waveguides, each of the output polarization means having a polarization axis;
   orienting the axis of the first input polarization means at a first angle relative to the axis of the first output polarization means, the first angle being essentially equal to ±90° plus the optical rotation suffered by reverse propagating light in the first waveguide at the first wavelength; and
   orienting the axis of the second input polarization means at a second angle relative to the axis of the second output polarization means, the second angle being essentially equal to ±90° plus the optical rotation suffered by reverse propagating light in the second waveguide at the second wavelength.

8. A method for using an optical system that comprises:
  (a) thin film optical waveguide means and means for applying a magnetic field to the waveguide means, the waveguide means having input and output ends and a TM and a TE direction and being adapted for causing, at a first temperature, essentially a 45° optical rotation of linearly polarized light of a first wavelength that propagates from the output to the input end if the plane of polarization of the light of the first wavelength is, at the output end of the waveguide means, oriented at an angle essentially equal to 22.5° relative to the TM or TE direction of the waveguide means; and
  (b) input and output polarization means for linearly polarizing light, the output polarization means associated with the output end of the waveguide means and set to produce a plane of polarization essentially at 22.5° relative to said TM or TE direction and the input polarization means associated with the input end of the waveguide means and set to produce a plane of polarization essentially 45° from the plane of polarization of the output polarization means;

the method comprising the step of:
  (c) transmitting light into the combination of (a) and (b) such that the transmitted light suffers, with respect to the combination of (a) and (b), a forward extinction ratio (FER) and a reverse isolation ratio (RIR) at the first temperature, the FER being at most about −1 dB and the RIR being less than about −20 dB;

characterized in that
  (d) the transmitting step comprises simultaneously transmitting light of at least two transmission wavelengths, at least one of the transmission wavelengths being at least 0.05 μm greater or smaller than said first wavelength.

9. The method of claim 8, wherein the optical system comprises an optical fiber wavelength division multiplexed communication system.

* * * * *